(12) United States Patent
Lemon

(10) Patent No.: US 11,256,345 B2
(45) Date of Patent: Feb. 22, 2022

(54) HAND OPERATED COMPUTER INPUT DEVICE WITH PALM HEEL SUPPORT

(71) Applicant: Ann Lemon, Palmdale, CA (US)

(72) Inventor: Ann Lemon, Palmdale, CA (US)

( * ) Notice: Subject to any disclaimer, the term of this patent is extended or adjusted under 35 U.S.C. 154(b) by 0 days.

(21) Appl. No.: 16/009,532

(22) Filed: Jun. 15, 2018

(65) Prior Publication Data
US 2019/0384422 A1   Dec. 19, 2019

(51) Int. Cl.
| G06F 5/08 | (2006.01) |
| G06F 3/0362 | (2013.01) |
| G06F 3/0354 | (2013.01) |
| G06F 3/0338 | (2013.01) |

(52) U.S. Cl.
CPC .......... G06F 3/0362 (2013.01); G06F 3/0338 (2013.01); G06F 3/03543 (2013.01); G06F 3/03549 (2013.01); *G06F 2203/0333* (2013.01)

(58) Field of Classification Search
CPC ......... G06F 3/03543; G06F 2203/0333; G06F 2203/0336; G06F 3/03547; G06F 3/03549; G06F 2203/0332; G06F 1/1679; G06F 1/1681; G06F 3/01; G06F 3/0202; G06F 3/0338; G06F 3/0362; G06K 9/00375; G06K 9/6272; G06K 9/6878; H03K 17/9622; H03K 2217/960725; H03K 17/962
USPC ................................................. 345/156–167
See application file for complete search history.

(56) References Cited

U.S. PATENT DOCUMENTS

| 5,576,733 | A | * | 11/1996 | Lo | G06F 3/03543 345/163 |
| 5,913,497 | A | * | 6/1999 | Myers | A47B 21/0371 248/118.5 |
| 6,064,371 | A | * | 5/2000 | Bunke | G06F 3/03543 345/157 |
| 6,396,478 | B1 | * | 5/2002 | Kravtin | G06F 3/03543 248/118.1 |
| 6,590,564 | B1 | * | 7/2003 | McLoone | G06F 3/03549 345/156 |
| 7,834,851 | B1 | * | 11/2010 | Fidali | G06F 3/039 345/163 |
| 8,054,292 | B1 | * | 11/2011 | Forde | G06F 3/03543 345/163 |
| 8,314,772 | B1 | * | 11/2012 | Coe | G06F 3/03543 345/163 |
| 8,760,269 | B2 | * | 6/2014 | Feldstein | G06F 1/1626 340/13.22 |

(Continued)

*Primary Examiner* — Duc Q Dinh

(57) ABSTRACT

A hand operated computer input device comprising a main body with a flat support surface for the entire palm heel is provided. The new support surface provided is not for the palm, metacarpals, proximal and intermediate finger segments, or wrist. Only a user's palm heel and finger tips touch the input device. The entire palm heel wholly supports the weight of a users hand and arm. There is no pressure on the median nerve at the wrist or in the hand.

There is no angle at the wrist while the hand maintains a generally neutral position. The height between the top of the palm heel support surface and the top surface of the buttons, wheels, etc. places the hand in a generally neutral, relaxed cupped position.

The present invention seeks to prevent repetitive strain injury (RSI) and Carpal Tunnel Syndrome while using a horizontal or vertical hand operated computer input device.

19 Claims, 14 Drawing Sheets

(56) References Cited

U.S. PATENT DOCUMENTS

2003/0169236 A1* 9/2003 Crocker ............. A47B 21/0371
                                                    345/168
2003/0234765 A1* 12/2003 Suh .................... G06F 3/03543
                                                    345/163
2005/0253805 A1* 11/2005 Kennedy ................ G06F 3/039
                                                    345/156

* cited by examiner

VERTICAL MOUSE
WITH SUPPORT FOR SIDE OF PALM HEEL AND SIDE OF HAND

HAND OPERATED COMPUTER INPUT DEVICE WITH PALM HEEL SUPPORT

BACKGROUND OF THE INVENTION

Field of the Invention

This present invention relates to a hand operated wired or wireless computer input device. The most popular hand operated computer input devices are commonly called a computer mouse or a computer keyboard. There are many alternative names for computer input devices such as a gaming mouse, vertical mouse, ergonomic mouse, Cad-Mouse®, multimedia controller, trackball mouse, Oyster Mouse®, OrthoMouse™, SpaceMouse®, wave keyboard, and gaming keyboard.

Description of the Related Art

Most inventions for a typical computer input device consist of providing a hand operated device with buttons, switches, wheels, a ball, a joystick, or some other mechanism to send and receive wired or wireless computer signals to navigate, select, create, or edit files or objects on a computer screen.

However, no computer input device inherently provides a support surface parallel to the bottom surface exclusively for the width of the palm heel, and at the same time; a user's palm does not touch the input device, reference FIG. 3A of this present invention.

The palm heel shape and strength is defined by nature. The strength of the palm heel found in nature is the left and right meaty or fleshy portions known as the 'ball' of the thumb and little finger on each side of the median nerve closest to the wrist. In anatomy, these meaty or fleshy cushions are called the thenar and hypothenar eminence muscles. If you place your hand flat with the palm (palmar) side down, there is an indentation on the palmar side between the thenar and hypothenar eminence muscles. Similar to a palm heel strike, because of the thickness of these muscles, there is no pressure placed on the center of the palm heel where the median nerve enters the hand. The natural structure or 'makeup' of the palm heel protects the median nerve in the carpal tunnel because any weight, pressure, or force will first be absorbed by the protruding thickness of the thenar and hypothenar eminence muscles instead of at the indentation in the center of the palm heel where the median nerve enters the hand.

Therefore, an objective of this present invention is to take advantage of the strength and cushion of these muscles closest to the wrist by providing a support surface for the palm heel. This surface will support the weight of a user's hand and arm while using a hand operated computer input device.

In prior art U.S. Patent 20050275621 Ergonomic Pointing Device, FIG. 6, the weight of the arm and hand must rest on the wrist and front forearm. See FIG. 3B of this present invention. The back edge of the palm heel, the wrist, and forearm are dragged across the desktop or mouse pad as the operator moves the mouse to affect objects on a computer screen. This causes repeated pressure and rubbing against the muscles, tendons, canals, nerves and other soft body tissue in the palm heel, wrist, and forearm that contributes to Repetitive Strain Injury (RSI). This same hand position is true for a computer keyboard. A user's wrist rests on a table top or wrist pad. The operator may also strain a wrist, forearm, elbow, upper arm or even a shoulder in an attempt to minimize or alleviate pressure on the wrist while using a hand operated computer input device.

A conventional mouse or keyboard requires a mouse pad, keyboard wrist support, or some other ergonomic object to lessen or remove the weight placed on the wrist; reference Wrist Rest Support for a Computer Mouse, U.S. Pat. No. 5,228,655A, and Wrist Support for Computer Keyboard, U.S. Pat. No. 5,125,606A.

In this prior art, the wrist pad or rest provides a cushioned support for the wrist however; the weight of the arm is still placed on the wrist.

In prior art U.S. D340923S, U.S. D331231S, U.S. D438209S1, and U.S. D494972S1 the hand is rolled inward over the mouse. "In simple terms, the primary cause of computer mouse RSI is the unnatural inwardly rolled position of the hand required by the shape of a conventional mouse and the location of the buttons, or finger actuated controls, thereon." Reference U.S. Pat. No. 6,396,479 B2, Ergonomic Computer Mouse.

In vertical mouse prior art U.S. Pat. Nos. 5,576,733A, 5,648,798A, and U.S. D632691S1, all four fingers are supported vertically stacked. Yet even the Top Rated Vertical Mouse, reference The 10 Best vertical Mice, Wiki.ezvid.com Feb. 2, 2018 offers a separate 'wrist support on the Evoluent Wrist Comfort Mousepad that lifts your forearm slightly to help align hand with forearm', reference evoluent.com. In vertical mouse prior art US20030234765A1, similar to a joystick, there's no inherent support surface for the side of the palm and the side of the palm heel reference FIG. 12 of this present invention. This support surface does not surround the entire input device. The support surface provided in FIGS. 11 and 12 of this present invention is only for the ulnar edge side of a user's palm and palm heel, and not for the side of the fifth digit (pinky finger) or for the side of a user's wrist. The built-in rest would provide support for the weight of a users hand and arm as well as lift a user's wrist off of a computer input device and off of a work surface or wrist pad. A user's forearm is also lifted off of a table top or wrist pad.

In horizontal mouse prior art such as U.S. D494972S1, the scroll wheel is rotatably attached to the upper casing and positioned between the primary and secondary mouse buttons. The scroll wheel on a conventional mouse is typically operated by the user's index or middle finger. In this present invention, a first embodiment positions the scroll wheel in the same location. In a second embodiment of this present invention, the scroll wheel is rotatably attached to the side of the computer input device and is operated by the user's thumb.

Prior art for computer input devices includes a palm support surface. This surface is typically at an angle to the bottom surface of the input device which places the palm heel at an angle to the work surface. Placing your palm on this surface, puts part of the weight of a users hand and arm on the palm and does not take full advantage of the strongest part of the hand which is the palm heel. Placing the palm heel at an angle to the work surface in prior art, puts the forearm on the work surface and creates an angle at the wrist.

Therefore, it is desirable to provide a computer input device with support for just the palm heel where the weight of a users hand and arm is placed on the width of the palm heel or just the width of the proximal edge of the palm heel, depending on the size of a user's hand, to eliminate any pressure or strain placed on the fingers, palm, wrist, or forearm while operating a computer input device. Pressure is not placed on the center of the palm heel where the median nerve enters the hand due to the thickness of the palm heel on each side of the median nerve. Even a vertical mouse with an integrated support for the side of the palm and palm heel per this present invention would allow the hand and wrist to move as one and eliminate rubbing the side of the hand, wrist, or forearm on a table top. The material used for the palm heel support, or for the side of a palm and palm heel support, may consist of or be covered with innovative plastics, elastomers, and textures that provide a comfortable feel to a palm heel, or to the ulnar side edge of the palm and palm heel of a user. The palm heel, or in the case of a vertical mouse, the ulnar edge side of a palm and palm heel adjacent to the fifth digit of a user's hand, supports the weight of the arm and hand instead of the side of the hand, side of the wrist, and forearm sharing and supporting this weight. In either case, the wrist, and forearm makes no contact with the desktop, tabletop, or mouse pad surface. In a standard horizontal mouse, providing a palm heel support on top of the computer input device parallel to the bottom surface of the input device also prevents the operator from rolling their hand inward over the device.

SUMMARY OF THE INVENTION

The present invention contrives to solve the disadvantages of the prior art.

A main objective of the present invention is to provide a hand operated computer input device with a casing that has an integrated palm heel support surface whereby a user does not place their palm on the input device. The palm heel support is not at an angle to the bottom surface of the computer input device which eliminates the possibility of the forearm or elbow from touching any surface, and removes the angle at the wrist. The support provided in the present invention is not for the proximal or intermediate finger segments or for the palm of a hand. When operating a computer input device per the present invention, the weight of a user's hand and arm is not at all placed on the palm, fingers, wrist, or forearm of a user. The weight of a user's hand and arm is supported by the width of a users palm heel, and not on the center of the palm heel where the median nerve enters the hand. There is no pressure on the median nerve as it enters the hand because of the thickness of the fleshy portions of the palm heel known as the 'ball' of the thumb and little finger on each side of the median nerve. In this present invention, the user places their palm heel on top of the computer input device. The palm heel support surface is at the highest or equal to the highest point on the top surface of the input device primarily for two reasons, (1) to maintain a stretched out and relaxed wrist while using the computer input device, and (2) to allow the distal finger segments to easily drop down onto the pointing device portion which gives more freedom of movement to the fingers rather than resting the intermediate and/or proximal finger segments on the input device. Resting or supporting the intermediate or proximal finger segments on any surface restricts or lessens the freedom of movement of the fingers. Imagine typing on a keyboard while your intermediate and/or proximal finger segments are supported by a surface. This finger position requires more effort or strain on your fingers and hand to type on the keyboard. Placing the palm heel on top of the input device lifts the user's wrist off of the tabletop and puts the weight of the arm on the palm heel instead of the wrist. Nothing touches the user's palm, metacarpal bones, wrist, middle and proximal finger bone segments, or forearm. This will prevent any damage to the palm, metacarpal bones and joints, wrist, middle and proximal finger segments, and forearm due to rubbing against a surface or the pressure caused by the weight of the user's hand and arm. Reference 10 Ways to Prevent Repetitive Strain Injury_by Deborah Quilter; #4 "Never rest your wrists on the desk, wrist pad or armrests while you are typing, or using a mouse or trackball." See Deborah Quilter www.RSIHelp.com.

Since the palm heel is not on the tabletop, the hand is not rolled inward over the computer input device. This is also a cause of "mouse RSI" according to the book entitled Repetitive Strain Injury A Computer User's Guide by Emil Paccarelli, M. D., and Deborah Quilter, (ISBN 0-471-59533-0, John Wiley & Sons Inc., 1994), reference U.S. Pat. No. 6,396,479B2.

The design of this present invention accomplishes another objective. The hand is relaxed and cupped on top of the input device and the angle at the wrist is eliminated whether using a keyboard or mouse. In contrast, see FIG. 3B of this present invention. The angle is created when the wrist and hand are placed on a tabletop, and the hand is lifted up to place the palm of the hand on the input device. This places a slight angle between the palm heel and the work surface. If the palm heel is on top of the input device as described in this present invention, then the metacarpus can remain parallel (FIG. 3A) to the carpus. Fatigue and strain to the wrist is reduced by eliminating this angle.

The palm heel, wrist, forearm, and input device move as one unit to position the cursor or screen object on the display. This prevents RSI to the wrist because of the tendency to keep the forearm or wrist stationary while gripping the input device and moving the hand to position the cursor to various points on the display. Moving as one unit reduces the lateral motion at the wrist. Less twisting at the wrist reduces the strain and fatigue to muscles, tendons, canals, nerves, and other soft body tissue in the wrist. While operating the input device, the wrist now maintains the same alignment with the palm heel that is achieved when the hand and arm are stretched out straight in front of you. When using a keyboard, there is also no angle at the wrist.

In order to achieve the above mentioned objectives in this present invention, the back of the input device is raised up and extended rather than sloped down to provide a support surface for the palm heel. This allows the palm and the palm heel to be completely on top of the input device.

Another objective of this present invention is to keep the popular style of a typical computer keyboard and mouse. The most common features of a typical mouse are two buttons and a center scroll wheel on the topside of the mouse, reference U.S. Pat. D439252S1.

Another embodiment of this computer input device will move the scroll wheel from the top of the input device to the side of the input device. The scroll wheel is operated by the users thumb, reference US Patent US 2003/0137490A1. The standard convention of this embodiment will be a thumb activated scroll wheel on the left side of the input device for right handed operators. An alternate embodiment is a thumb activated scroll wheel on the right side of the input device for left handed operators.

Other than the standard or typical hand operated computer input device largely used for surfing the Internet, selecting, creating or editing files and objects, the embodiment of this design is also applicable to other types of wired and wireless hand operated computer input devices. See FIG. 9.

Another aspect of the invention provides a hand operated input device for a computer system.

The hand operated input system for a computer system comprises:
  a pointing-device portion;
  an integrated horizontal palm heel support portion extending from a neck portion and comprising in a preferred embodiment;
    a top surface having a convex sloping up portion;
    a bottom surface;
    a first side surface for connecting the top surface and the bottom surface;
    a second side surface for connecting the top surface and the bottom surface; and
    a rear surface connected to the top, bottom, a first side, and a second side surfaces.

The palm heel support surface is configured to support a palm heel of the user comfortably, such that a wrist portion of the user is generally stretched in a relaxed fashion and makes no contact with a surface.

The convex portion of the top surface generally slopes up to the palm heel support may be configured to support the palm heel of the user snugly.

The convex generally sloping upward portion of the top surface to the palm heel support surface may have a predetermined height from a floor, such that the wrist portion is straightened substantially so as to ease out stress on the wrist portion.

The horizontal palm heel support portion may have a predetermined width so as to support the entire palm heel of the user comfortably.

The horizontal palm heel support portion may have a predetermined length so as to support the entire palm heel of the user comfortably.

The horizontal palm heel support portion may comprise a bottom sliding portion with a lowered friction against the floor.

The computer input device may comprise known roller tracking, optical tracking, laser tracking, or any technology that processes the movement of a user's hand with a hand operated input device.

The horizontal, vertical, or diagonal pointing-device portion may comprise buttons, wheels, wheel clicks, grips, a tracking ball, a ball, laser, a knob, switches, sensors, levers, scrollbars, scroll clicks, lights, joystick, a multi-touch surface, and any mechanism to select or control on-screen objects.

The top surface of the horizontal palm heel support portion has a predetermined height from the bottom surface that allows the corresponding shoulder and upper arm to be in a relaxed position while the hand maintains a generally neutral, relaxed cupped position.

The hand operated input system may further comprise a neck portion disposed between the pointing-device portion and the palm heel support portion, and the neck portion may vary in length in different embodiments.

The advantages of the present invention are; (1) a users palm, wrist, middle and proximal finger segments, and forearm do not touch any surface, (2) there is no pressure on the median nerve in the palm heel as it enters the hand because of the thickness of the palm heel on each side of the median nerve, (3) the palm heel support surface is at the highest point on the top surface so the wrist remains in a stretched out relaxed position and the distal finger segments can naturally drop down onto the lower pointing device portion, (4) for a vertical mouse, the horizontal support surface is for the blade edge side of the ulnar side of the palm and palm heel, and does not support the fingers (vertically stacked) or wrist; whereby (5) the hand operated input device provides an easy solution to RSI problems. Although the present invention is briefly summarized, the fuller understanding of the invention can be obtained by the following drawings, detailed description and appended claims.

BRIEF DESCRIPTION OF THE DRAWINGS

These and other features, aspects, and advantages of the present invention will become better understood with references to the accompanying drawings, wherein.

DETAILED DESCRIPTION EMBODIMENTS OF THE INVENTION

Please refer to FIG. 1 to FIG. 5 for a first embodiment.

Figure 1:
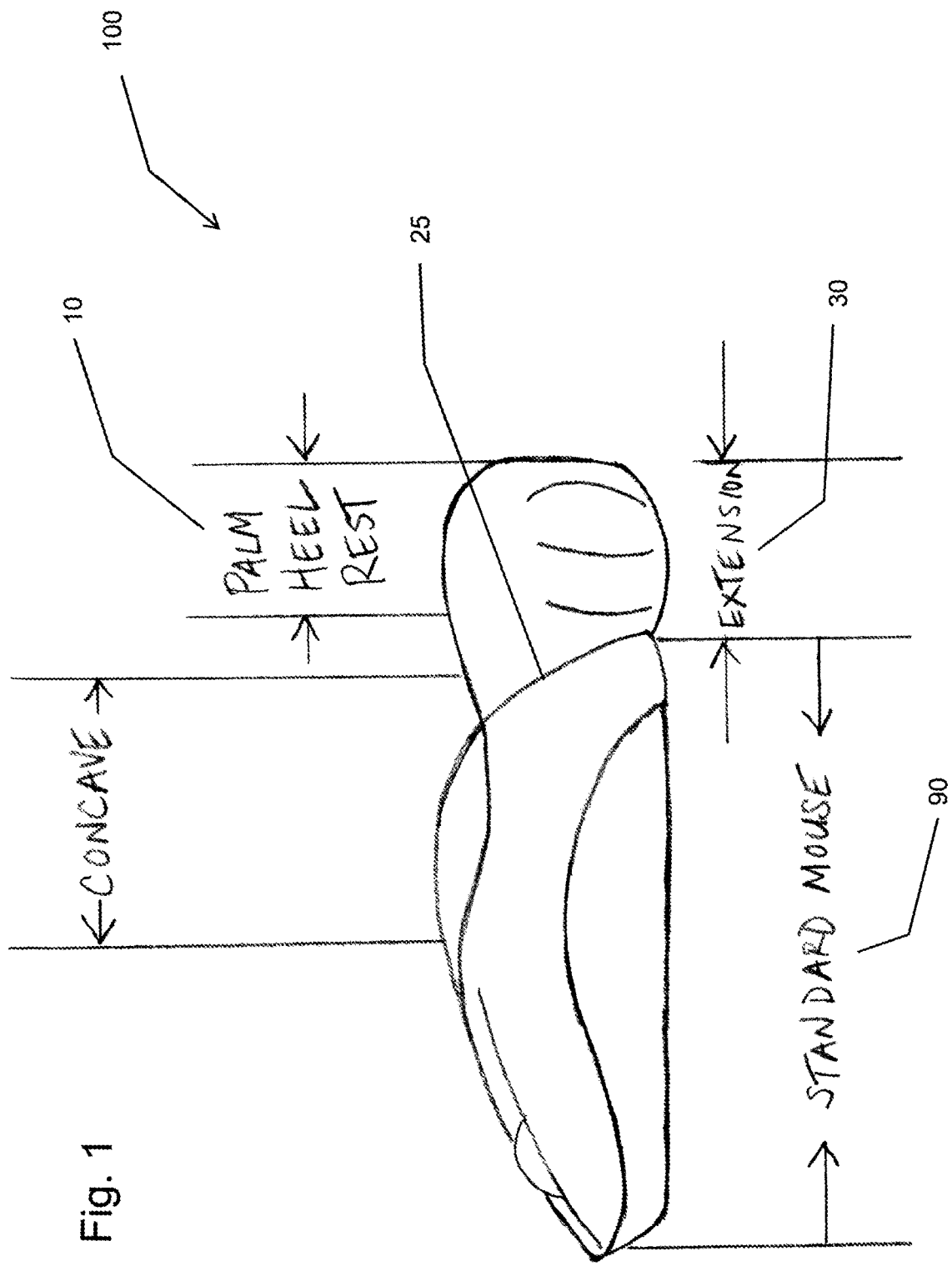
FIG. 1 is a side view of a conventional mouse, in comparison to and upgraded with the shape and length of the back of a first embodiment that provides a horizontal support surface for a users entire palm heel according to the present invention.
Figure 2:
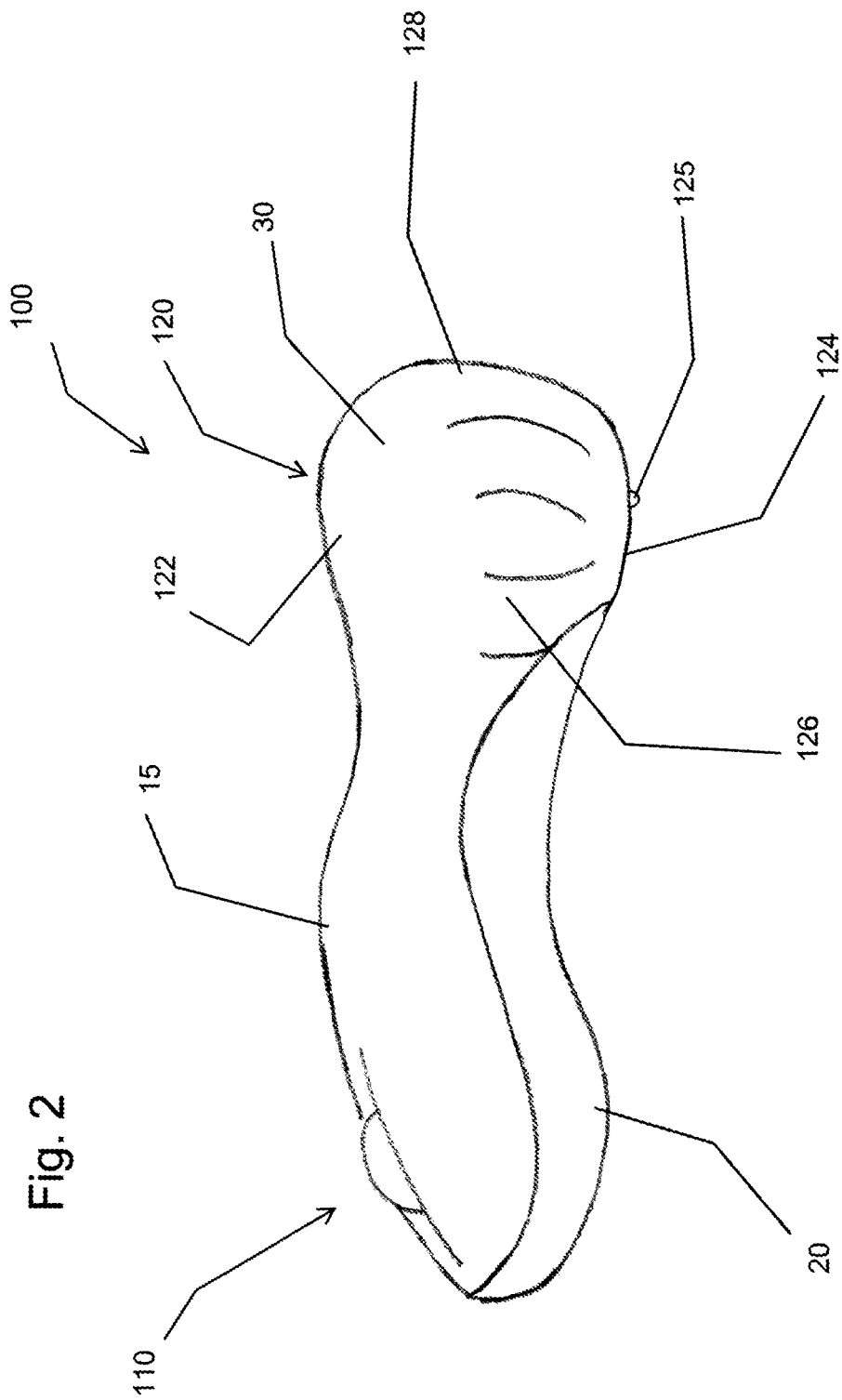
FIG. 2 is a side view of a first embodiment according to the present invention. This embodiment is shown with an upper and lower casing however, the palm heel support could be integral to a single casing.

A computer input device (100) with a horizontal support (10) for the palm heel that is parallel to the bottom surface of the input device, primarily consists of a typical mouse housing portion (90), as shown in FIG. 1, FIG. 2 that includes an upper casing (15) and a lower casing (20) coupled to the upper casing (15), however the back of the upper casing (15) is not sloped down like the portion (25), in FIG. 1, especially as shown in (50) U.S. Pat. No. 7,304,636B2, but is extended like the portion (30) to provide a seat or support surface for the palm heel as shown in FIGS. 1 and 2.

Figure 3A:
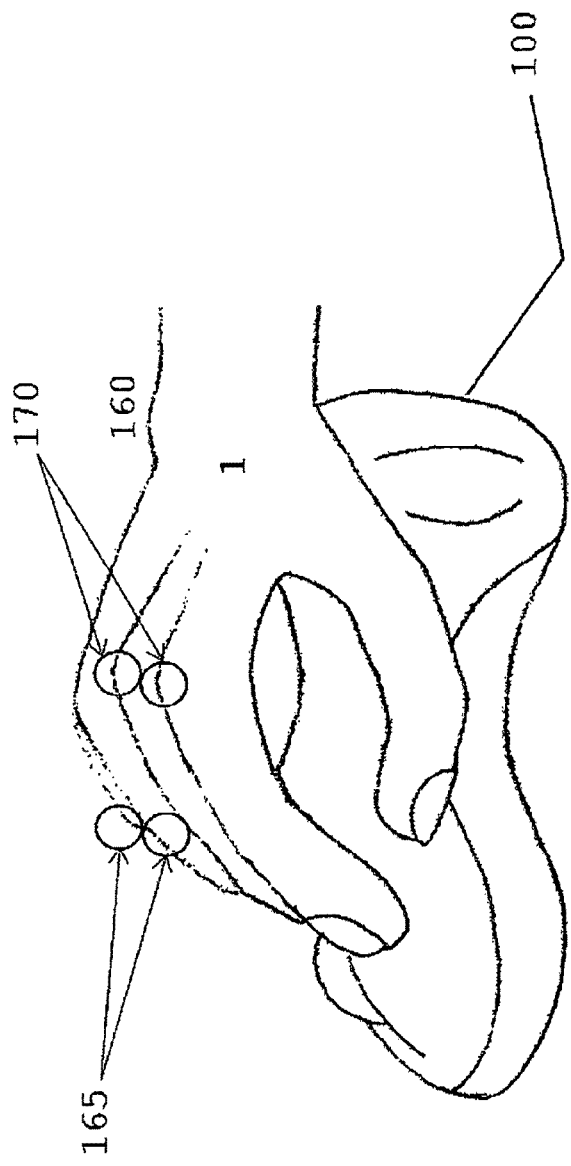
FIG. 3A is a side view of a first embodiment according to the present invention showing the user's entire palm heel parallel to the bottom surface of the input device, and supported on top of the input device at the highest point on the top surface with the buttons and wheel sloped downwards, wherein a users palm, metacarpal bones and joints, middle and proximal finger segments, wrist, and forearm are shown not touching any surface.
Figure 3B:
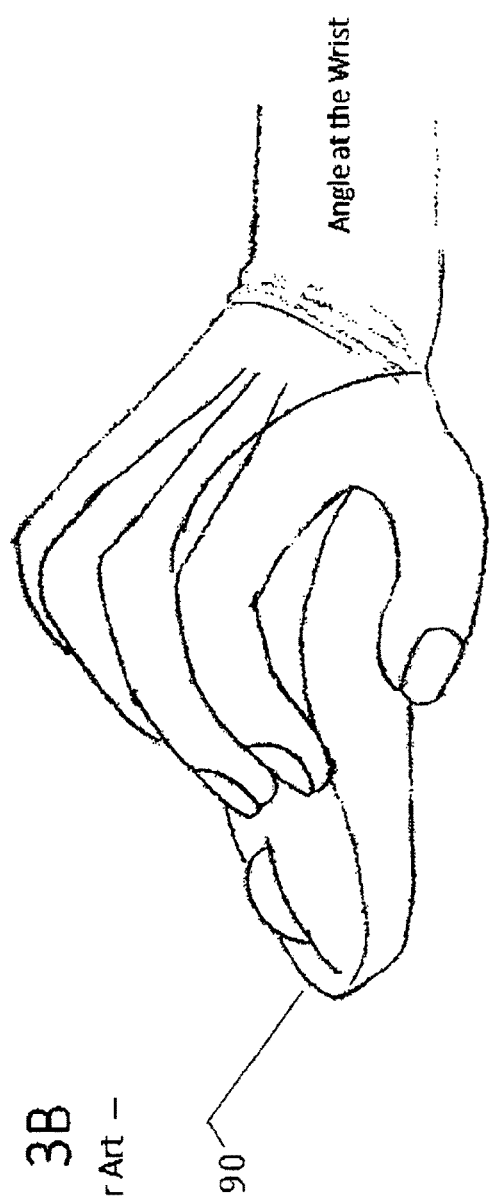
FIG. 3B is a side view of a user's hand over a computer input device according to prior art wherein there is a palm support surface that places the palm heel at an angle to the bottom surface of the input device, placing an angle at the wrist and placing the wrist and forearm on a tabletop; such as U.S. Pat. No. D340923.

FIG. 3A is a side view of a first embodiment according to the present invention showing a flat, relaxed wrist (160), a cupped hand with a bend at the Proximal Interphalangeal (PIP) joints (165), and at the Metacarpophalangeal (MCP) joints (170), and the user's entire palm heel (1) is parallel to the bottom surface of the input device, and supported on top of the input device at the highest point on the top surface. Since the entire palm heel is on top of the I/O device (FIG. 3A), rather than behind the I/O device (FIG. 3B), the weight of the arm is placed wholly on the entire palm heel instead of the palm, middle and proximal finger segments, wrist, or forearm, and the user's hand does not have to roll inward to grip the I/O device. Nothing touches the user's palm, metacarpal bones and joints, middle and proximal finger segments, wrist, or forearm. This eliminates pressure and rubbing against the palm, metacarpal bones and joints, wrist, middle and proximal finger bones, and forearm of a user.

Figure 4:
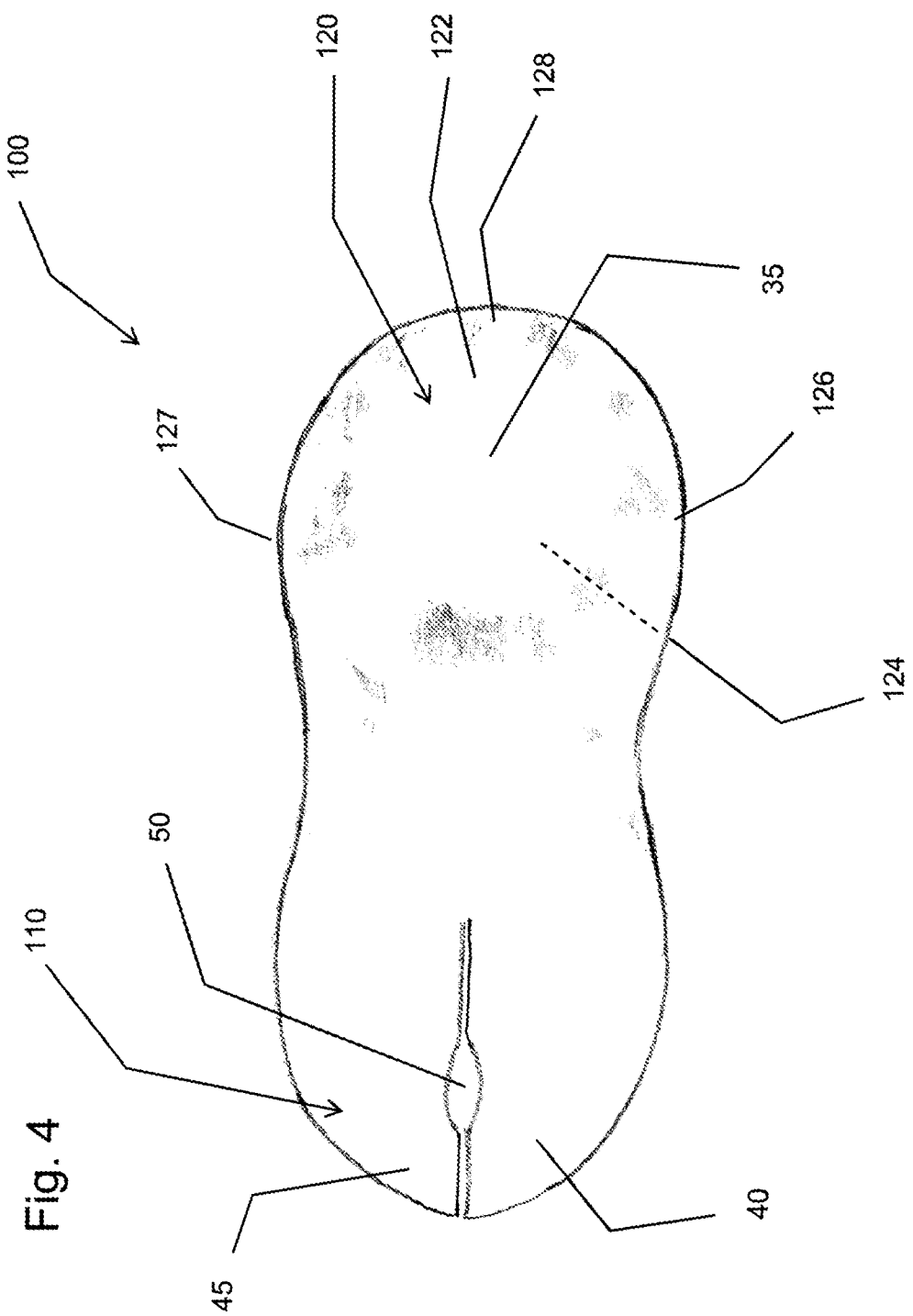
FIG. 4 is a top view of a first embodiment showing a stationary, horizontal support surface for the palm heel parallel to the bottom surface of the input device according to the present invention.
Figure 5A:
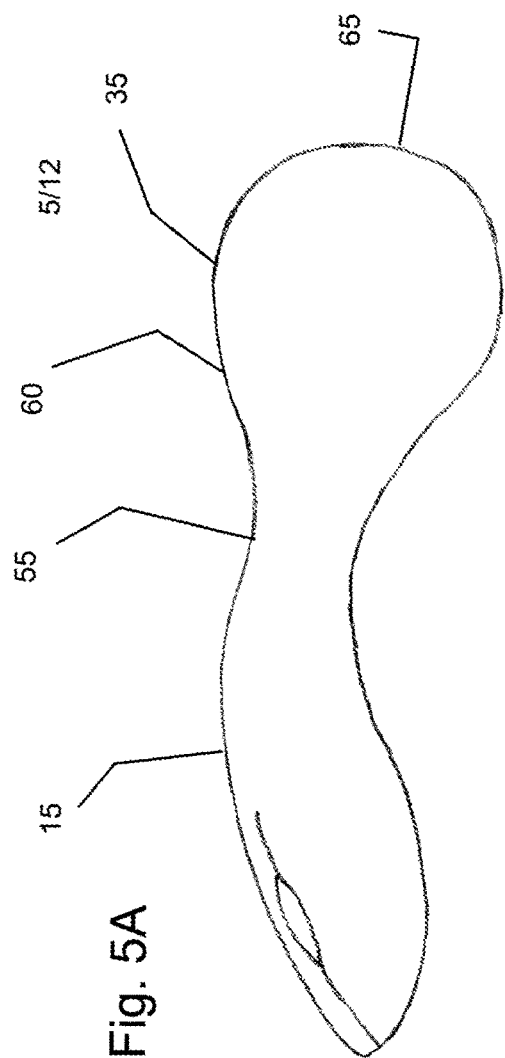
FIG. 5 is a top half and bottom half view of a first embodiment wired computer input device according to the present invention.

FIG. 4 is a top view showing a palm heel support (35), primary (40) and secondary (45) depressible buttons, and a top scroll wheel (50). The upper casing (15) in FIG. 5A has a concave shape (55) just aft of the main depressible buttons, then slopes up (60) to provide a support surface (35) at the highest point on the top surface for the palm heel. This concave shape (55) is not required to provide the palm heel support surface; it is merely a cosmetic selection. The operator does not have to strain a wrist, forearm, elbow, upper arm or even a shoulder to minimize or alleviate pressure on the wrist while using a computer input device. The back edge (65) of the input device is straight down rather than sloped down as shown in FIGS. 5 and 6. The user can move the computer input device in any direction on the table top by applying slight pressure to a palm heel while moving the same hand. This causes the input device, palm heel, wrist, and forearm to move as one unit. There is no RSI to the wrist because of the tendency to keep the forearm stationary while gripping the input device and moving just a hand to position the screen object to various points on the display. Moving as one unit reduces the lateral motion (RSI) and twisting at the wrist.

Figure 5B:
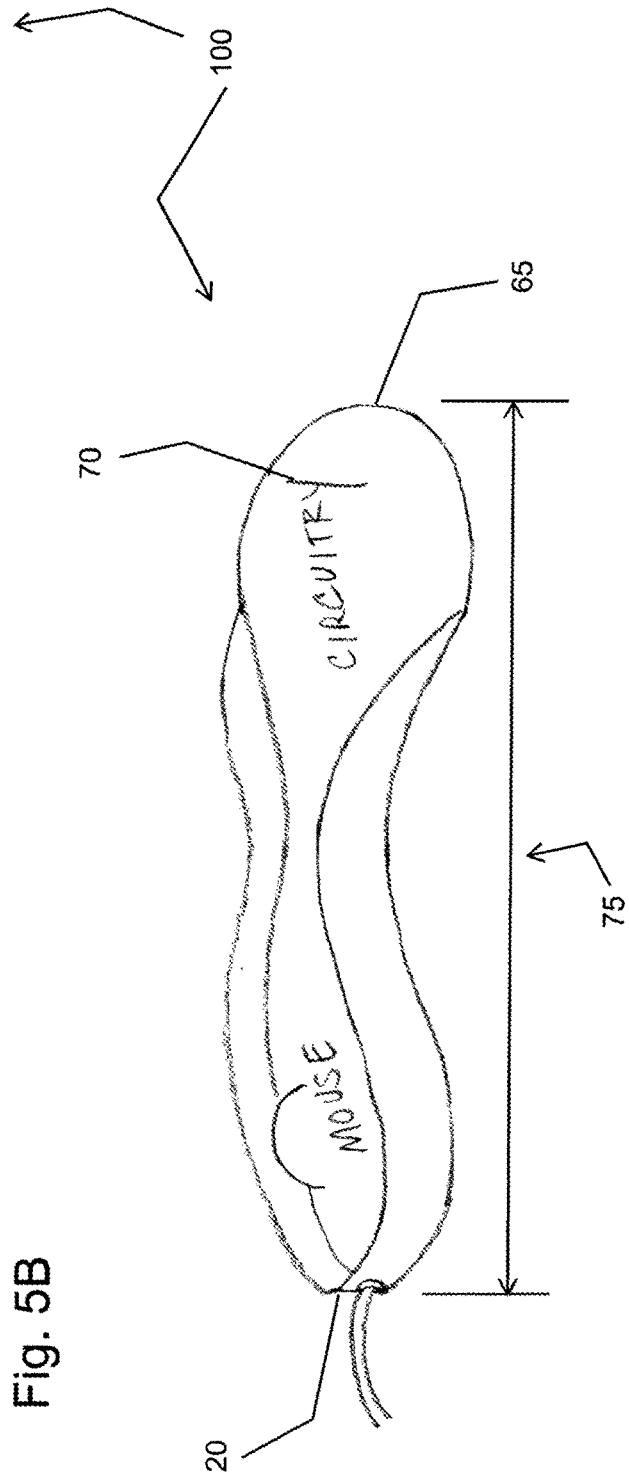
Figure 6:
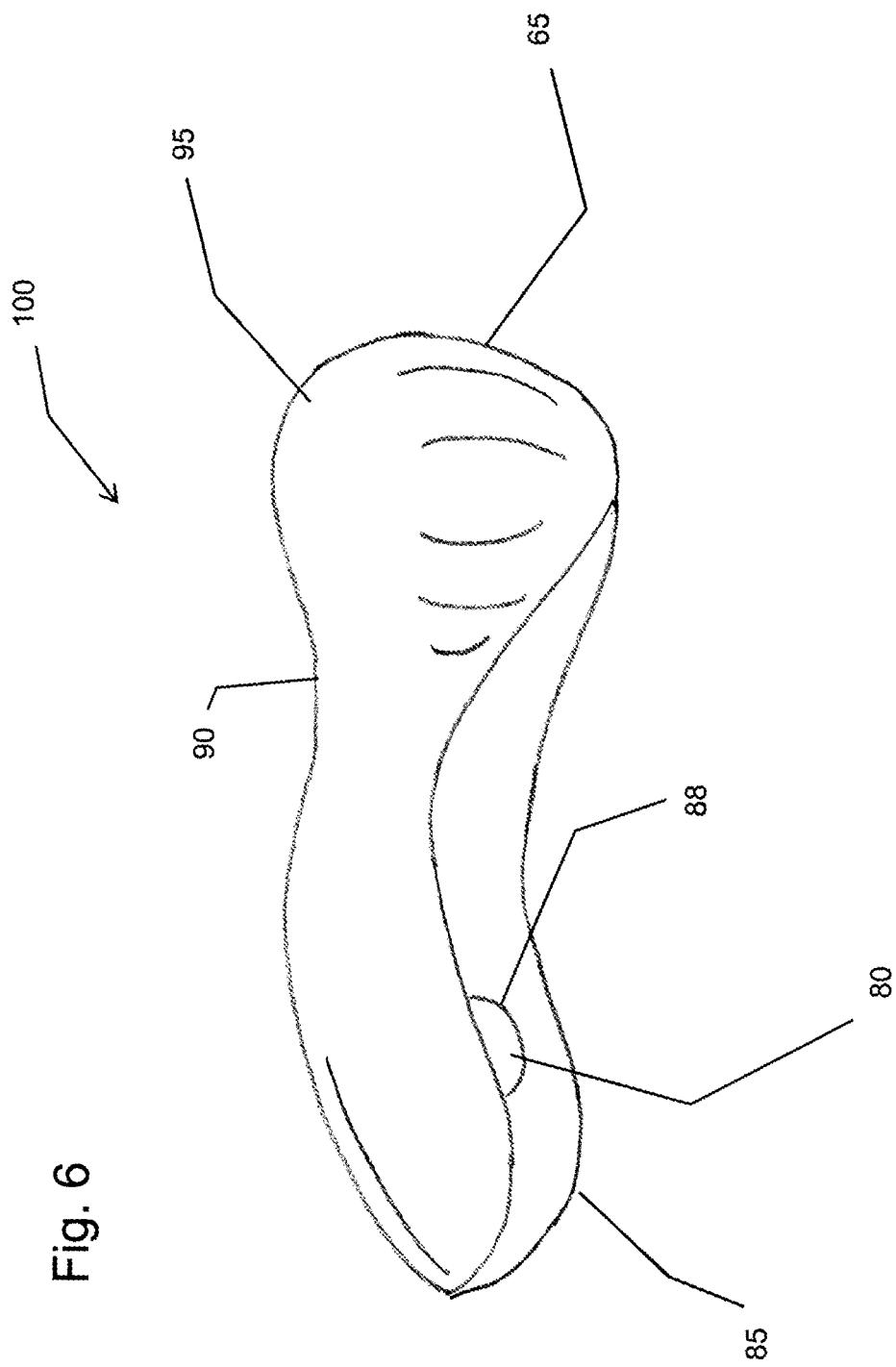
FIG. 6 is a side view of a second embodiment according to the present invention showing the scroll wheel on the left side of the input device for right handed operators.

In FIG. 5B, the lower casing (20) contains the required circuitry (70) to select and control objects on a display (not shown). The span (75) shows the extended length of the lower casing (20) to mate to the upper casing (15) for the palm heel support (35). The present invention applies to wired and wireless computer input devices. A lower casing (20) may include but is not limited to a roller ball, optical tracking, laser tracking, or any technology known in the art that processes the movement of a user's hand with the input device to update the position of a cursor on a display.

Reference U.S. Pat. No. 7,216,398B2 "The mouse circuit mechanism for a wired mouse is typically supplied power by a computer. The mouse circuit mechanism for a wireless mouse is typically supplied power by a battery. Since the computer mouse is well known technology, no further detailed description is provided about the housing and the circuit mechanism." All current and future technology to select and control objects on a display using a hand operated computer input device may be applied to the casing described in this present invention.

A second embodiment shown in FIG. 6 applies the palm heel support casing (35) of this present invention to a hand operated computer input device with a side scroll wheel (80). Here, the scroll wheel is moved from the top of the input device to the side of the input device. The scroll wheel is operated by a users thumb, reference U.S. Patent 20030137490A1. The side scroll wheel (80) in FIG. 6 of a second embodiment can use, but is not limited to Tilt Wheel Technology™ to allow scrolling in four different directions, reference U.S. Patent 20040150623A1. The standard convention of this embodiment is a thumb activated scroll wheel on the left side of the input device for right hand operators. An alternate embodiment is a thumb activated scroll wheel on the right side of the input device for left hand operators. A thumb activated scroll wheel (80) is not a new feature and may include both a side and top scroll wheel. However, the most popular hand operated computer input devices place the scroll wheel on the top side of the device. The upper casing concaves (90) just aft of the depressible buttons, then rises to provide a support surface (95) at the highest point on the upper casing for the palm heel according to the present invention. The lower casing (85) provides a cutaway (88) for a side scroll wheel (80) as shown in FIG. 6. The cutaway (88) for the side scroll wheel (80) may be provided on either or both sides of the upper and lower casings (85), and is not the main focus of this present invention.

Figure 7:
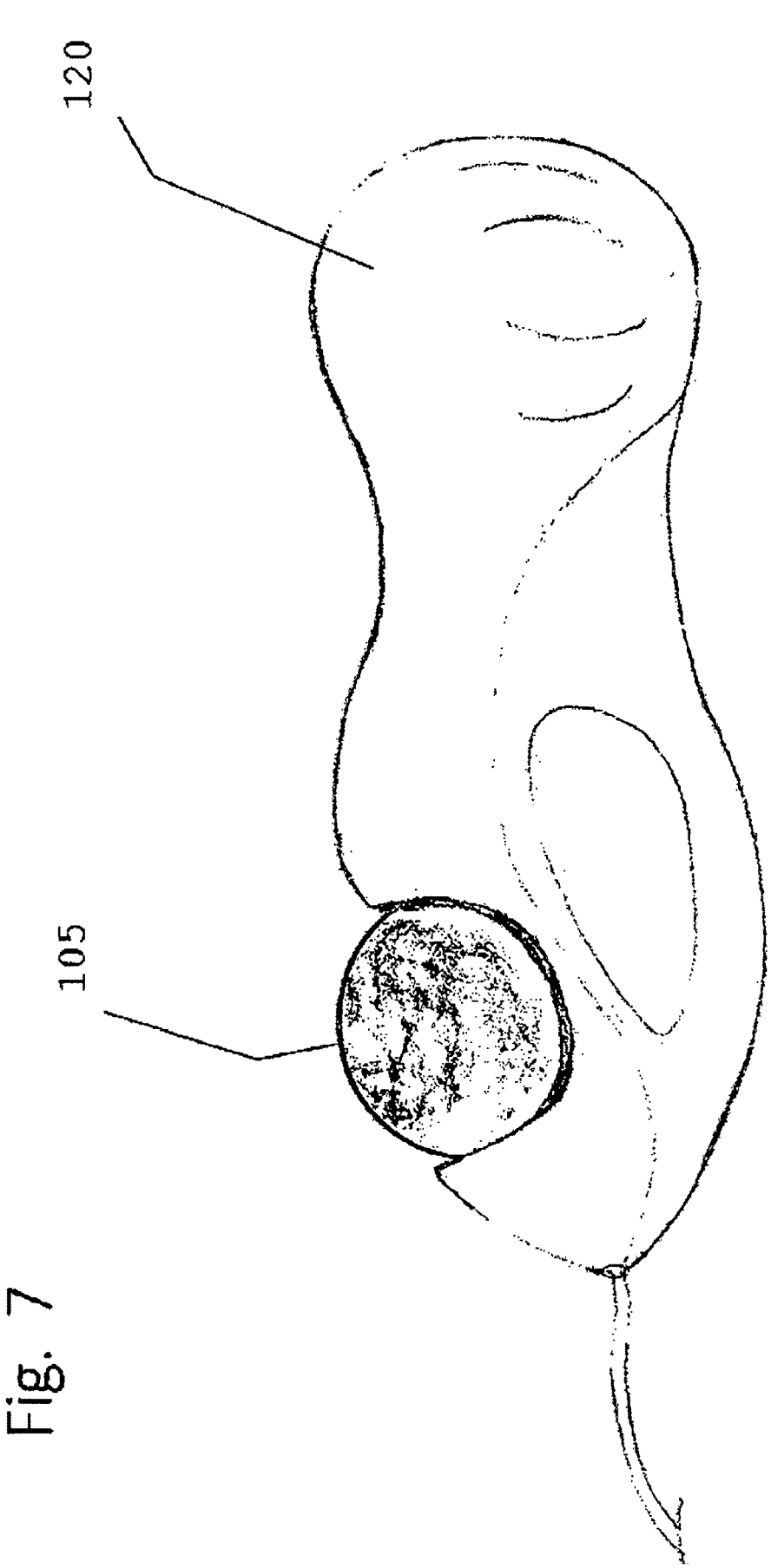
FIG. 7 is a side view of a third embodiment with a horizontal palm heel support according to the present invention showing a tracking ball used to position a mouse cursor to select or move objects on a display.

A third embodiment in FIG. 7 applies the present invention to a mouse with a tracking ball (105) used to position a cursor or select an object on a display. This application is to show the palm heel support can be applied to any hand operated computer input device. The upper casing provides a stationary support (120) for the palm heel integral to and not externally attached to the computer input device according to the present invention.

Figure 8:
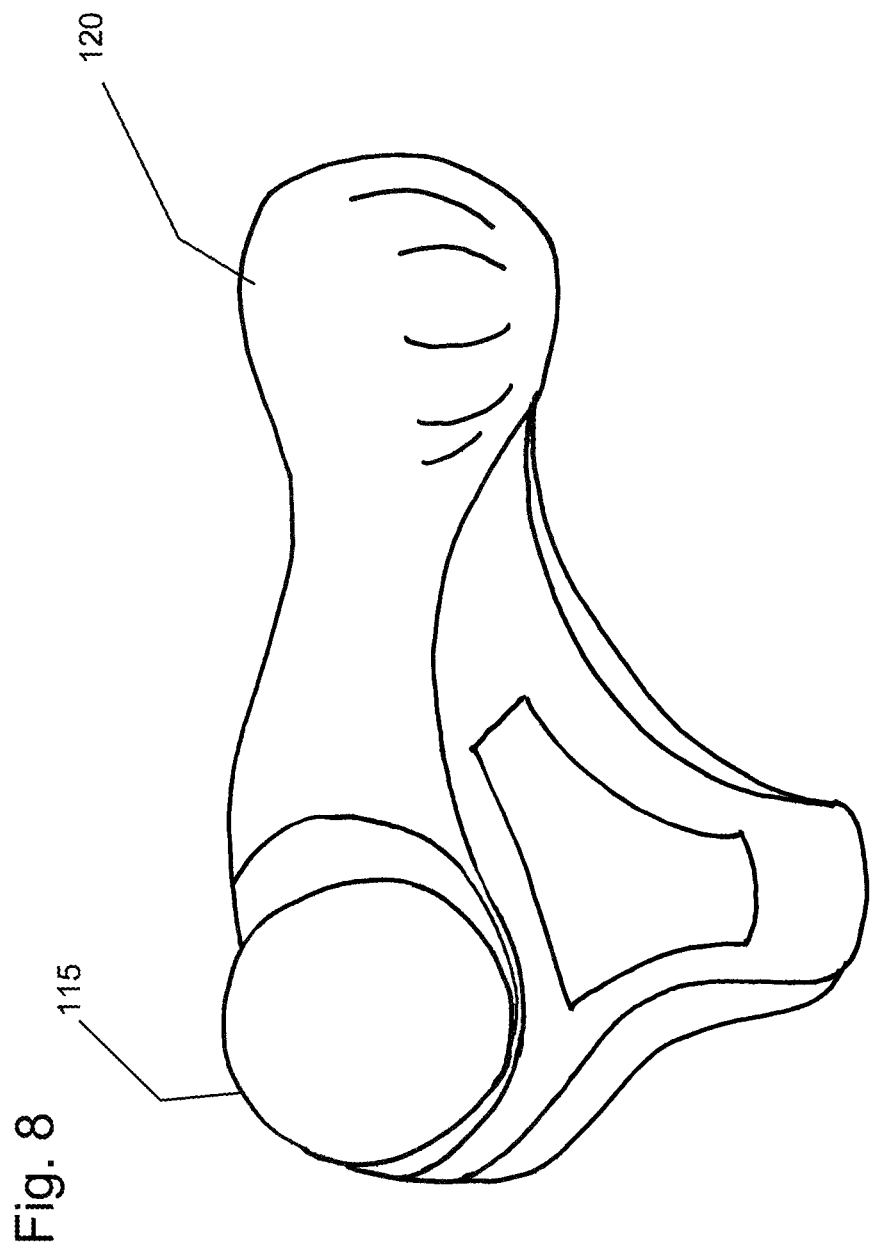
FIG. 8 is a side view of a fourth embodiment with a horizontal palm heel support according to the present invention also showing a tracking ball used to position a mouse cursor to select or move objects on a display.

FIG. 8 shows a fourth embodiment, Logitech's TrackMan® Marble® showing a tracking ball (115) used to position a cursor or screen object on a computer display seated lower than the palm heel support surface (120) according to this present invention. With a tracking ball, in keeping with the spirit and scope of this invention, the best ergonomic position is to place the palm heel support surface high enough relative to the top of the tracking ball to where a user's distal finger segments can drop down and spin the ball without re-creating an angle at the wrist.

Figure 9:
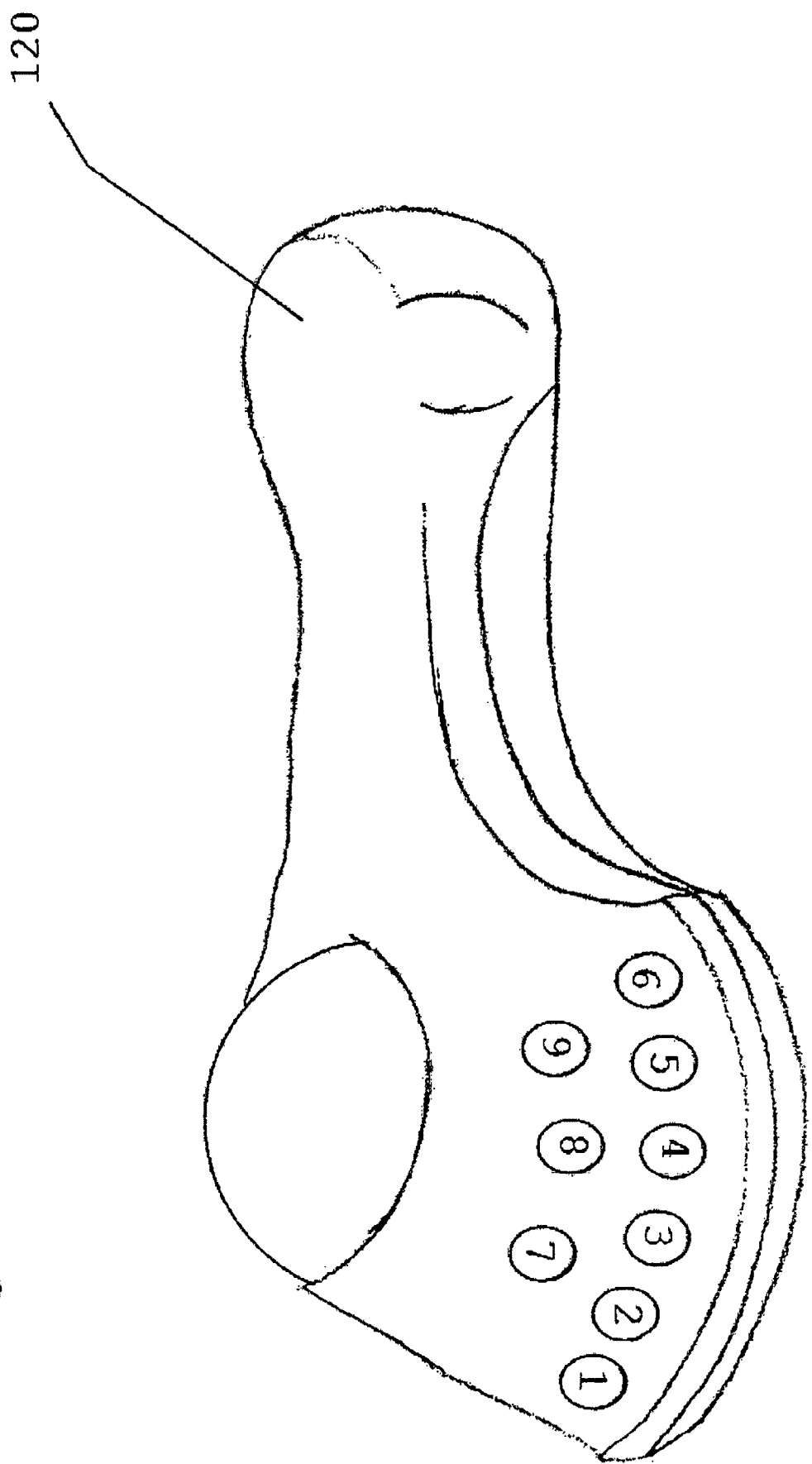
FIG. 9 is a side view of a fifth embodiment with a horizontal palm heel support showing a typical ball used to position objects and text for multi-dimensional CAD (Computer Aided Design) drawings according to the present invention. In place of the ball could be a joystick, knob, or some other control used to affect objects on a display.

FIG. 9 is a fifth embodiment showing a computer input device used to position objects and text for multi-dimensional drawings such as the SpaceBall® or SpaceExplorer™ by 3D Connexion with a palm heel support (120) according to this present invention.

Figure 10:
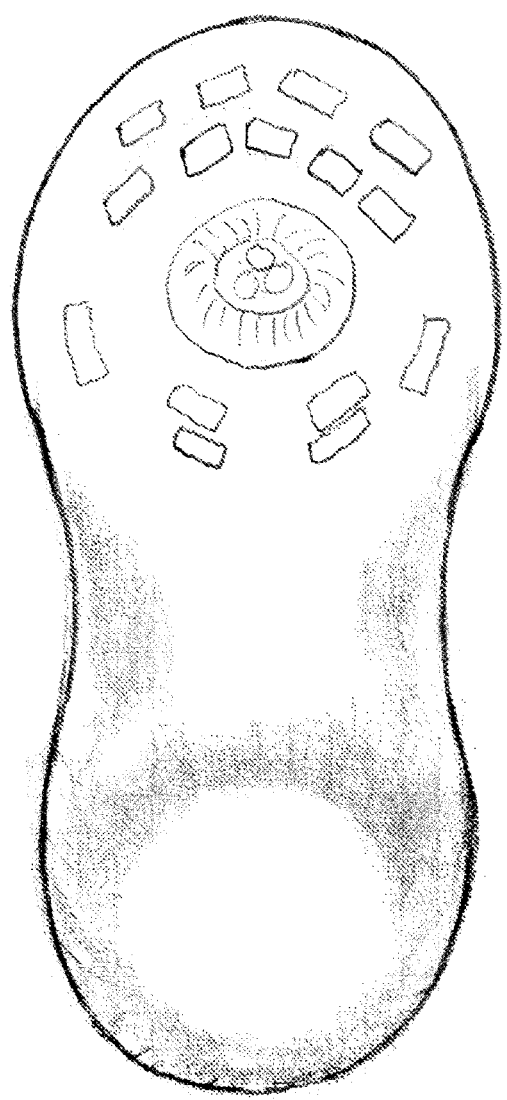
FIG. 10 is a top view of a sixth embodiment applied to Contour Design's ShuttlePRO v2®. This sketch is intended only as a replica of the ShuttlePRO v2®. The sketch adds depth and height for an integral palm heel support similar to FIG. 2 of this present invention (a side view). The palm heel support could be lengthened to allow a user to easily access the aft buttons on the ShuttlePRO v2®.

FIG. 10 is a sixth embodiment applied to Contour Design's multimedia controller ShuttlePRO v2® and could also be applied to their ShuttleXpress®. These computer input devices would benefit from an integrated palm heel support surface higher than the pointing device portion according to this present invention.

Figure 11:
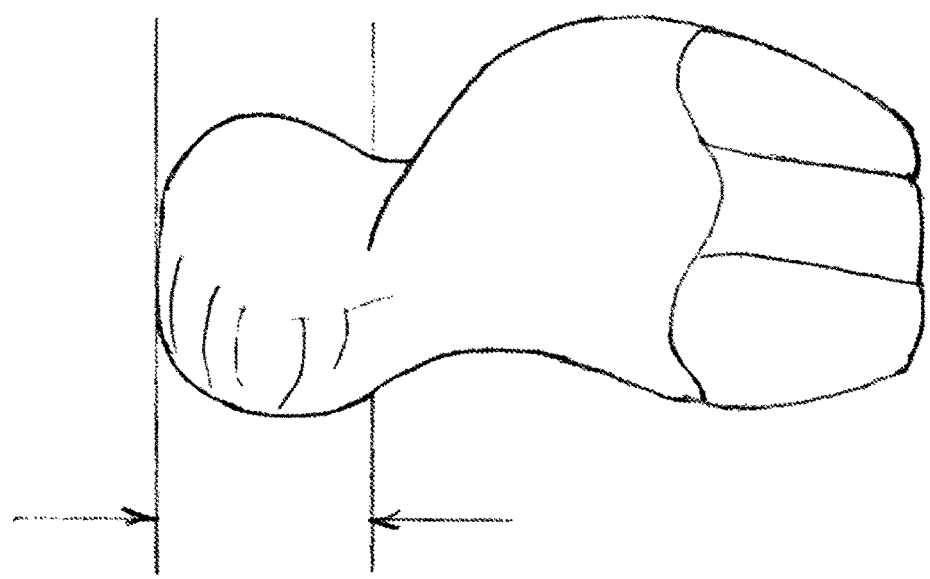
FIG. 11 is a side view of a seventh embodiment showing a right handed vertical mouse with an integrated horizontal palm heel support surface for the ulnar edge side of a palm and palm heel adjacent to the fifth digit of a user's hand where the support surface does not go around the entire pointing device portion according to the present invention.

FIG. 11 is an seventh embodiment similar to the Evoluent vertical mouse adding support for the side of a user's hand and palm heel according to the present invention.

Figure 12:
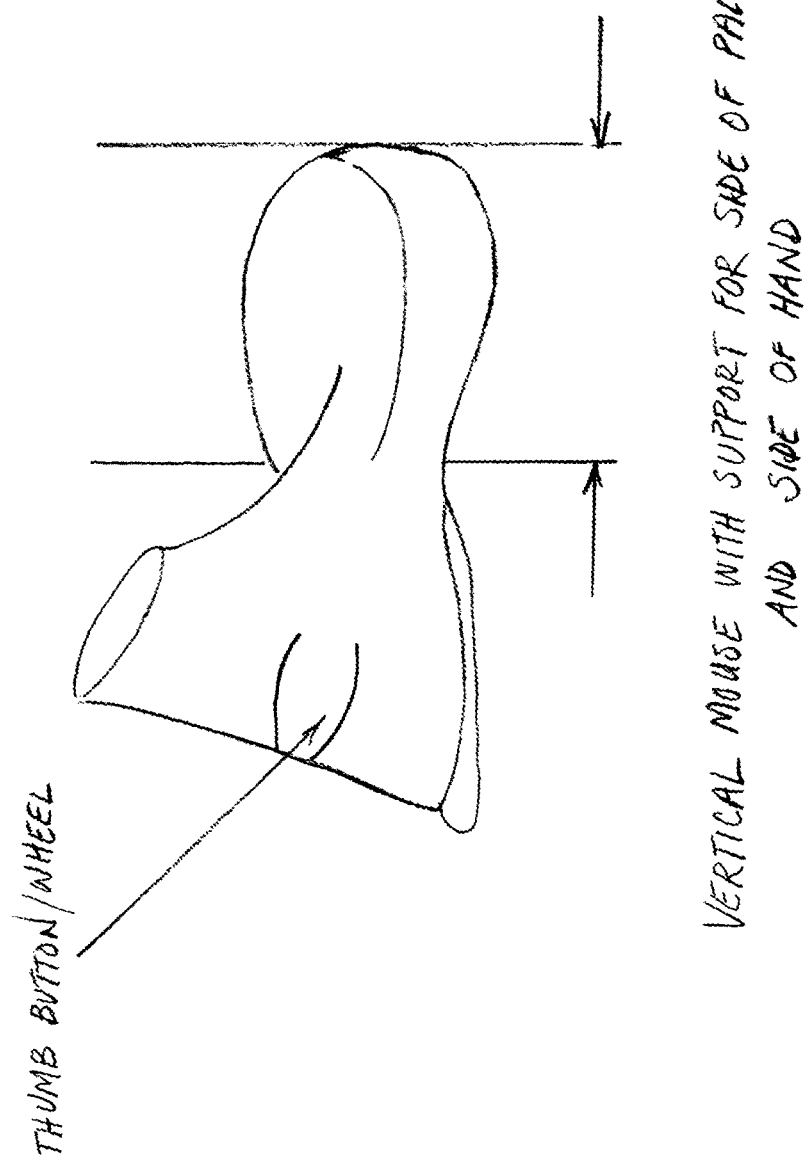
FIG. 12 is a side view of an eighth embodiment showing a right handed vertical mouse with a horizontal palm heel support surface for the ulnar edge side of a palm and palm heel adjacent to the fifth digit of a user's hand according to the present invention. Like FIG. 11, the support surface does not surround the entire pointing device portion and does not support a user's fingers or wrist. While the fingers and/or thumb touch the pointing device portion, the hand and arm are supported entirely by the ulnar edge side of a user's palm and palm heel. The addition of an integrated palm heel support applies to any wired or wireless vertical mouse such as the Anker AK-98ANWVM-UBA®, the Adesso iMouseE10®, or the Evoluent VerticalMouse 4®. The support for the side of the hand and/or palm heel side may be symmetrical or asymmetrical since a user's hand is mostly on just one side of the input device. As with a horizontal computer input device, the added palm heel support for a vertical input device may be of any length, width or height without departing from the spirit or scope of the present invention.
Figure 13:
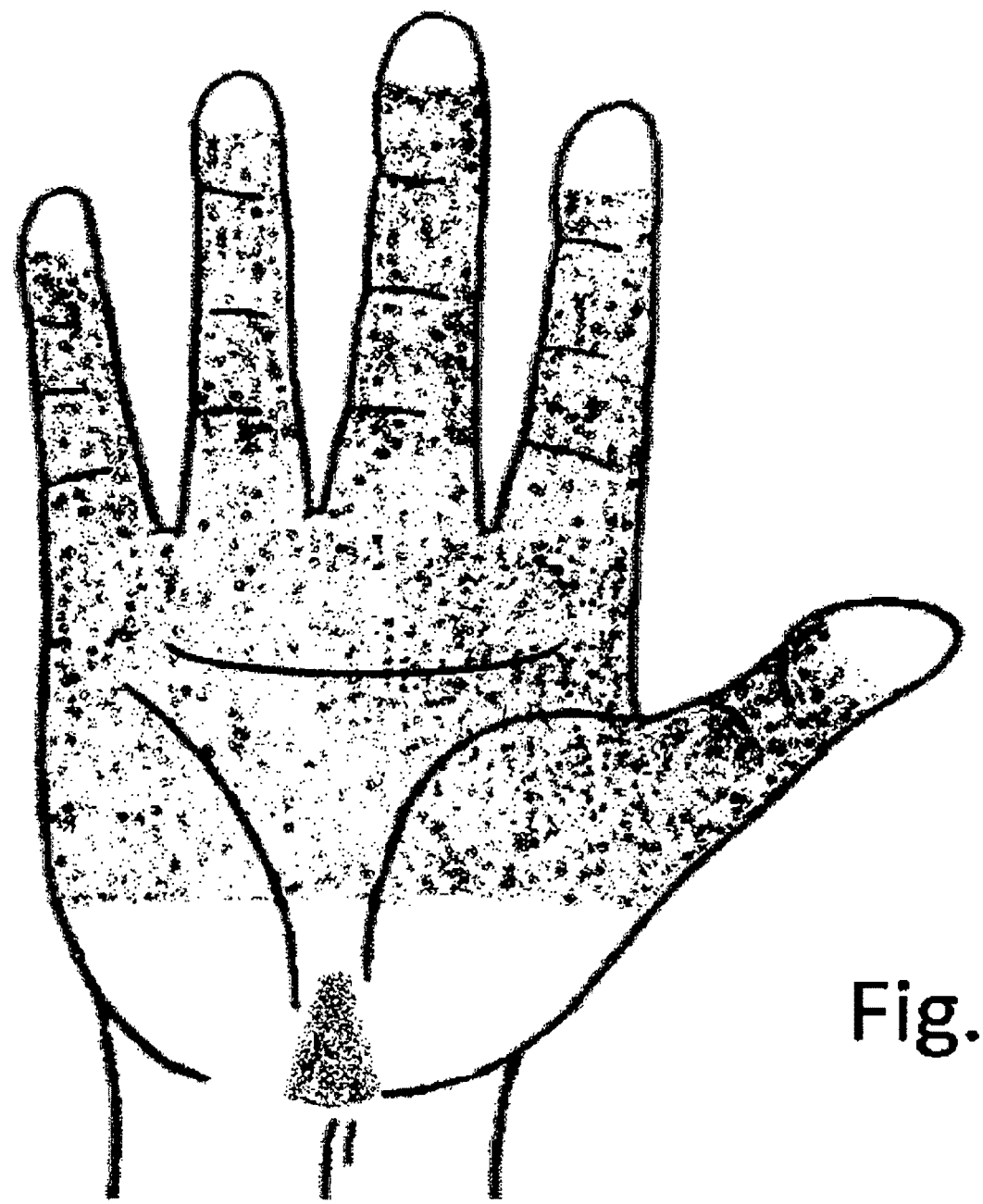
FIG. 13 is a palm view of a hand of a user. The shaded area shows where the hand makes no contact with a horizontal computer input device according to the present invention.

FIG. 12 is an eighth embodiment showing a vertical computer input device with built-in support for the side of a user's hand and palm heel according to the present invention;

FIG. 13 is the palm side of a human hand. The shaded area shows where the hand makes no contact with a computer input device according to the present invention.

Figure 14:
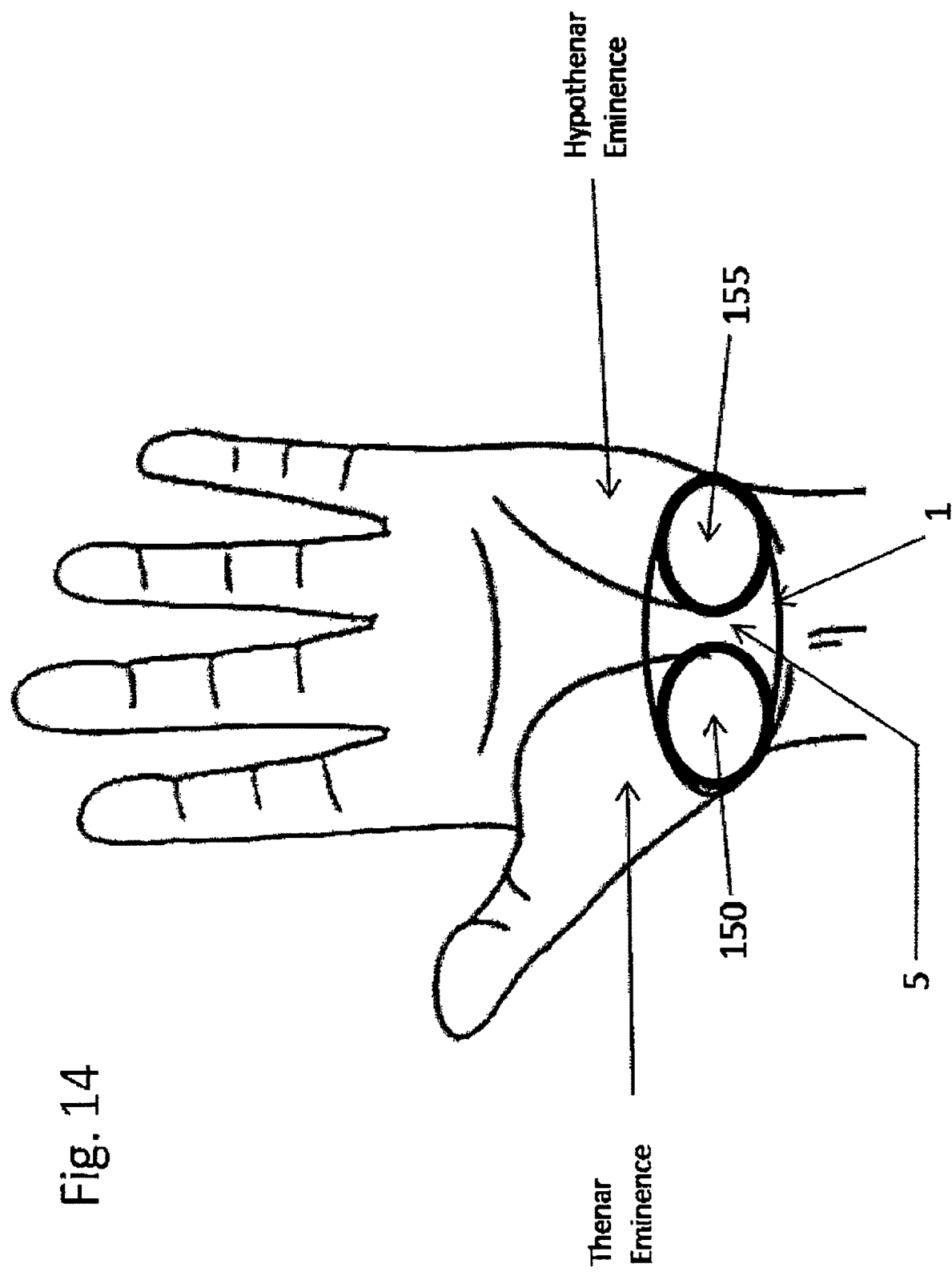
FIG. 14 is a palm side view of a hand of a user illustrating protection of the median nerve by the natural structure of the palm heel.

FIG. 14 is a palm side view of the hand, whereby providing a support surface for the entire palm heel (1) per the present invention as shown in FIG. 3A, protects where the median nerve enters the hand (5), because of the protruding thickness of the thenar eminence muscle (150) and the hypothenar eminence muscle (155) found naturally in the palm heel.

Although the present invention has been explained in eight separate embodiments, "it is understood that many ornamental designs, modifications, and variations can be made to provide a support surface for the palm heel or the side of the hand and palm heel without departing from the spirit and scope of this present invention", reference U.S. Pat. No. 7,216,398B2.

As described earlier, the embodiment of a palm heel support according to this present invention is also applicable to other types of wired or wireless hand operated devices that create, select, modify, move, or delete objects on a display screen.

Other than the standard or typical hand operated computer input device largely used for surfing the Internet, selecting, creating or editing text and objects, the embodiment of this design is also applicable to other types of wired and wireless hand operated devices that select or move objects on a display as shown in FIG. 7.

Another aspect of the invention provides a hand operated input device for a computer system.

The hand operated input system FIG. 2 (100) for a computer system comprises:
  a pointing-device portion (110);
  a palm heel support portion (120) extending from a neck portion and comprising:
    a top surface having a convex portion that generally slopes upwards to a palm heel support surface FIG. 4 (35);
    a bottom surface (124);
    a first side surface (126) for connecting the top surface and the bottom surface;
    a second side surface (127) for connecting the top surface and the bottom surface; and
    a rear surface (128) connected to the top, bottom, a first side, and a second side surfaces (122, 124, 126, 127) as shown in FIGS. 2 and 4.

The palm heel support portion (120) is configured to support the width of a palm heel of the user comfortably, such that the palm of a user does not touch any surface, and the palm heel, wrist, and forearm are not at an angle to the bottom surface of the input device, wherein a wrist portion of the user is generally stretched in a relaxed fashion and makes no contact with a surface.

The convex portion of the top surface (122) generally sloping upwards to provide the horizontal palm heel support surface (120) may be configured to support the palm heel of the user snugly.

The convex portion of the top surface (122) of the palm heel support portion (120) may have a predetermined height from a floor, such that the wrist portion is straightened substantially so as to ease out stress on the wrist portion.

The palm heel support portion (120) may have a predetermined width so as to support the width of the palm heel of the user comfortably.

The palm heel support portion (120) may have a predetermined length so as to support the length of the palm heel of a user comfortably.

The palm heel support portion (120) may comprise a computer mouse bottom surface portion well known in the art that has a lowered friction or resistance when moving across a work surface. The sliding portion may be disposed so as to be leveled with a bottom portion of the pointing-device portion.

The sliding portion may comprise one or more roller devices, optical or laser tracking (125) as shown in FIG. 2.

The pointing-device portion (110) may comprise a computer mouse, a tracking ball, a ball, a knob, buttons, wheels, switches, and a joystick.

The top surface (122) of the palm heel support portion (120) may vary in height in different embodiments as long as a users corresponding shoulder and upper arm maintain a relaxed position and a users palm heel, wrist and forearm remain parallel to the bottom surface of the computer input device.

The hand operated input system may further comprise a neck portion disposed between the pointing-device portion and the palm heel support portion, and the neck portion may vary in length in different embodiments.

While the invention has been shown and described with reference to different embodiments thereof, it will be appreciated by those skilled in the art that variations inform, detail, compositions and operation may be made without departing from the spirit and scope of the invention as defined by the accompanying claims.

What is claimed is:

1. A hand operated input device for a computer system, comprising:
   a housing that includes an upper casing and a lower casing coupled to the upper casing;
   wherein a flat horizontal support surface for an entire palm heel is integral to the upper casing and parallel to a bottom surface of the input device,
   whereby in use a hand of a human user is in a relaxed neutral cupped position wholly on top of the input device and a wrist is generally stretched out flat and relaxed, wherein there is no pressure placed on a median nerve in the hand and there is no angle at the wrist to prevent a repetitive strain injury; and
   there is no support surface for an upper palm area of the hand, and no support surface for a metacarpal bone, a proximal finger segment, or an intermediate finger segment of the hand;
   therefore the upper palm, metacarpal bones, and proximal and intermediate finger segments do not touch the input device.

2. The input device of claim 1, whereby in use, the hand is not flat across or rolled inward over the input device, because there is no support surface for the palm of the hand, but the hand is cupped on top of the input device while maintaining the flat relaxed wrist position to prevent the repetitive strain injury.

3. The input device of claim 1, wherein the palm heel support surface is configured that the wrist is generally stretched out in the relaxed position and makes no contact with the input device, a desktop, a tabletop, or a mouse pad surface to eliminate pressure and rubbing against the wrist of the user's hand.

4. The input device of claim 1, wherein the palm heel support is configured such that all of a weight of the user's hand and arm is supported only by the user's entire palm heel, whereby in use,
   because of a natural thickness of a thenar and hypothenar eminence muscles on each side of the median nerve in the palm heel, the weight and pressure from the user's hand and arm is not placed on the median nerve, or shared between the palm, metacarpals, proximal and intermediate finger segments, palm heel, wrist, or a forearm of the user;
   but the pressure and weight of the user's hand and arm is focused on the thicker, fleshy, palm heel of the user found in nature on each side of the median nerve.

5. The input device of claim 1, wherein the housing is configured for manual movement by both the hand and arm of the user as one unit across a surface so as to permit a corresponding movement of a screen object on a display of the computer, wherein a lateral motion at the wrist of the user's hand created when moving a typical computer mouse by keeping a forearm of the user's hand stationary and moving just the hand is reduced.

6. The hand operated input system of claim 1, wherein a measurement from the top of the palm heel support surface to the bottom surface of the computer input device may have a predetermined height; wherein the user's hand still maintains the relaxed cupped position on top of the input device, while the palm heel is not at an angle to a work surface, and the palm heel, wrist, and forearm of the user are still parallel to the bottom surface of the computer input device, and an associated shoulder and upper arm of the user's hand are in a relaxed comfortable position; not flexed up or down, and not in a stressed position.

7. The hand operated input system of claim 1, wherein a measurement of the palm heel support surface or the entire computer input device may have a predetermined width, wherein the user can still depress, scroll, and manipulate a pointing device portion while the hand remains in the relaxed cupped position.

8. The hand operated input system of claim 1, wherein a measurement of the palm heel support surface or the entire computer input device may have a predetermined length, wherein the user can still depress, scroll, and manipulate a pointing device portions while the hand remains in the relaxed cupped position and the wrist remains stretched out and relaxed.

9. The input device of claim 1, wherein the palm heel support surface is flat and does not pivot or move in any direction other than any flexibility in the material used for the palm heel support surface which keeps the palm heel, wrist, and a forearm parallel to a work surface while a corresponding shoulder and upper arm are relaxed and not stressed or flexed up or down.

10. The hand operated input system of claim 1, further comprising a neck portion integrally extended between a pointing-device portion and the palm heel support surface, that may have a predetermined length to establish the relaxed cupped hand position wherein;
    the neck portion is not a support surface for any part of the hand therefore, a shape of the neck portion is only a cosmetic choice and may not be generally concave.

11. The hand operated input system of claim 10, wherein a top surface is configured with an aesthetically shaped concave neck portion that integrally extends to slope generally upwards to form the support surface for the entire palm heel.

12. The input device of claim 1, wherein a top surface of the palm heel support is positioned at a higher elevation or equal to the highest elevation of any other top surface along the upper casing, wherein a measurement between the top of the palm heel support surface and the top surface of a pointing-device portion may have a predetermined height to establish the relaxed cupped hand position.

13. The input device of claim 12, wherein a modification to provide the palm heel support surface is adaptable to a low profile computer input device and generally adaptable to hand operated computer input devices.

14. The input device of claim 1, whereby in use only a width of the user's palm heel and distal finger segments or finger tips touch the input device.

15. The input device of claim 14, whereby the user's fingers are allowed to freefall down on to the input device to use the finger tips or distal finger segments to more easily select a button, wheel, ball, knob, and other control surfaces on the computer input device because;
    the user's palm, metacarpals, and proximal and intermediate finger(s) segments do not touch the computer input device, and the palm heel of the user's hand is elevated to a highest or equal to the highest surface on a top surface of the input device.

16. The input device of claim 15, whereby in use, the fingers from a MCP joint (knuckles) forward are freely leveraged downward eliminating any strain to press, scroll, or otherwise select widgets on the computer input device surface whereby:
    the user's hand is cupped and relaxed on top of the computer input device,
    an angle between the user's palm heel and a work surface is eliminated, and the palm heel is on or equal to the highest point on the top surface of the computer input device.

17. The hand operated input system of claim 16, when applied to the input device with a tracking ball, the height of the flat horizontal palm heel support surface relative to the top surface of the tracking ball;
- allows the hand of the user to be cupped on top of the input device, wherein the tracking ball is moved with the user's distal finger segments,
- while maintaining the palm heel parallel to the work surface, and the stretched out relaxed wrist position.

18. The input device of claim 1 when applied to a vertical computer input device, wherein the horizontal palm heel support surface is only for a blade edge, ulnar edge side of the palm and palm heel, adjacent to a fifth digit of the user's hand to prevent pressure or rubbing the side edge of the user's hand, wrist, and forearm along a work surface or mouse pad.

19. The input device of claim 18 wherein a weight of the user's hand and arm is supported on the blade edge side of the user's palm and palm heel; and
- the horizontal palm heel support surface does not support a palmar side of the hand, a pinky finger, the finger segments, or the wrist of the user's hand, and may be symmetrical and centered around a pointing-device portion, or asymmetrical and more to one side of the pointing-device portion.

* * * * *